Nov. 15, 1966 D. M. MELLEN ET AL 3,285,046
TUBE INDENTING APPARATUS
Filed Sept. 4, 1963
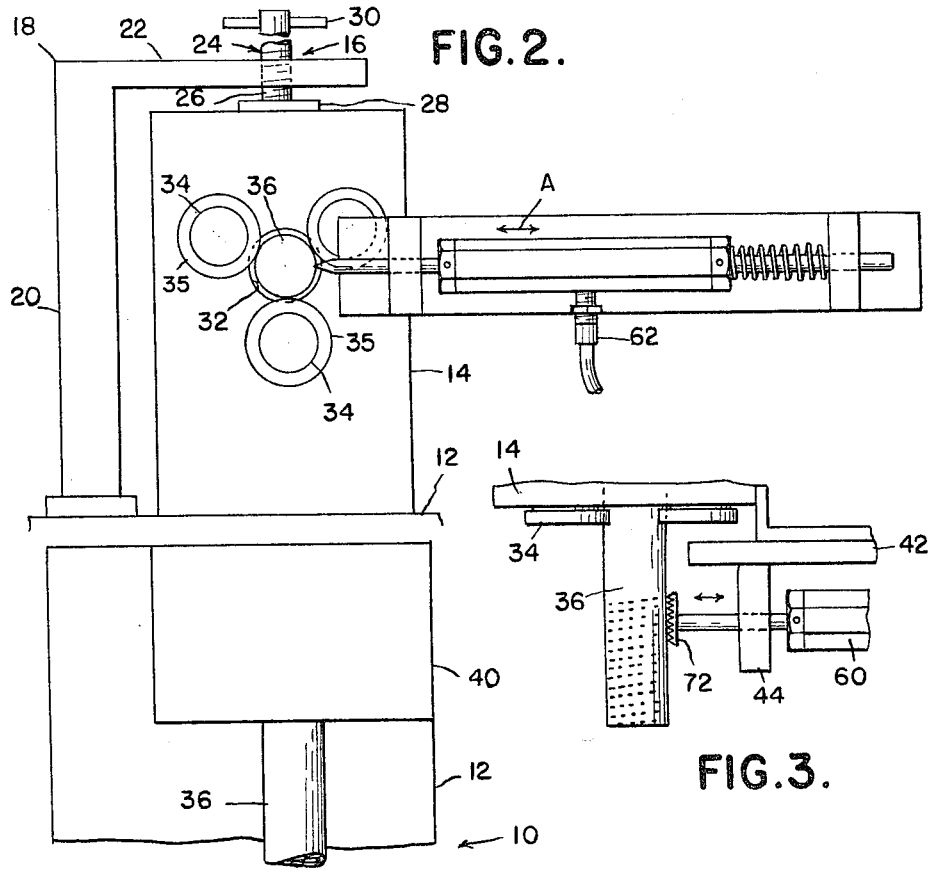
FIG. 2.
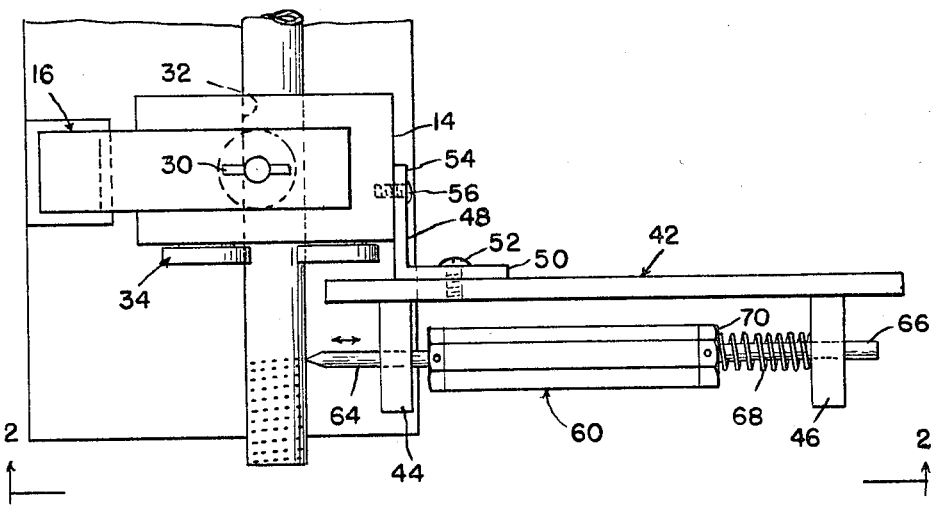
FIG. 3.
FIG. 1.
INVENTORS
DAVID M. MELLEN
DAVID A. SINGER
BY Whittemore, Hulbert & Belknap
ATTORNEYS

United States Patent Office 3,285,046
Patented Nov. 15, 1966

3,285,046
TUBE INDENTING APPARATUS
David M. Mellen, Ann Arbor, and David A. Singer, Harper Woods, Mich., assignors to Calumet & Hecla, Inc., Allen Park, Mich., a corporation of Michigan
Filed Sept. 4, 1963, Ser. No. 306,495
8 Claims. (Cl. 72—76)

The present invention relates to an apparatus for placing a predetermined pattern such as indentations, dimples, or the like on the outer periphery or surface of an elongated tube. The fabricated patterned tube is particularly adapted to be used in flooded freon chillers. The purpose of the fabricated patterned tube is to provide nucleation sites for freon type refrigerant boiling.

It is an object of the present invention to provide an apparatus to impart a particular indentation or shape in a specified surface pattern on the outside surface of a tube comprising a tube support, means for advancing the tube in a helical path along the axis thereof, a tool having an end opposite the outer periphery of the tube, and means for oscillating the tool to impart its end configuration to the helically advancing tube to form a pattern thereon.

Another object of the present invention is to provide an apparatus for placing a predetermined pattern on the outer periphery of an elongated tube as it is advanced axially comprising a tube support, a fixture carried by the support, means for advancing the tube in a helical path through the support, a vibrator carried by the fixture and movable lengthwise with respect to the fixture upon actuation thereof, and a tool connected to the vibrator and having an end opposite the outer periphery of the tube, said vibrator being effective to oscillate the tool so as to impart the end configuration of the tool to the helically advancing tube to form a pattern thereon.

Still another object of the present invention is to provide an apparatus of the aforementioned type wherein the vibrator is operated pneumatically.

A further object of the present invention is to provide an apparatus of the aforementioned type wherein resilient means is interposed between the fixture and the vibrator to cushion the back stroke of the vibrator and tool.

A still further object of the present invention is to provide an apparatus of the aforementioned type wherein the resilient means is in the form of a spring.

It is thus another object of this invention to provide a simplified low-cost structure of the aforementioned type having certain advantages contributing to efficiency, reliability and long life as well as ease of maintenance.

Further objects and advantages of the present invention will be apparent from the following description, reference being had to the accompanying drawing wherein a preferred form of the present invention is clearly shown.

FIGURE 1 is a plan view of the apparatus, with parts broken away.

FIGURE 2 is a front elevational view of the apparatus looking in the direction of arrows 2—2 of FIGURE 1.

FIGURE 3 is a fragmentary plan view of another embodiment of the present invention.

Referring now to the drawing, the apparatus is designated by the numeral 10 and includes a substantially horizontal support or table 12 having a tube support 14 mounted thereon by means of an adjustable clamp 16. The clamp 16 includes an inverted L-shaped bracket 18 having the free end of the long arm 20 connected to the support 12. The short arm 22 of the bracket 18 threadedly carries an adjustable threaded locking device 24. The locking screw 24 includes a threaded shank 26 threadedly connected to the arm 22. The shank 26 is provided at the lower end thereof with a clamping plate 28 and is provided at the upper end thereof with a manually operable handle 30 which is adapted to rotate the threaded shank 26 so as to urge the clamping plate 28 into fastening or clamping engagement with the top surface of the tube support 14.

The tube support 14 may be made from wood, metal, or any other suitable material. The tube support 14 is provided with a centrally located opening 32. A plurality of rollers 34 are mounted about the periphery of the opening 32 on the forward side thereof. Each roller 34 is provided with a resilient and yieldable cover 35 made, as an example, from rubber. The rollers 34 are adapted to grip the elongated tube 36 as it emerges from the opening 32.

A conventional drive mechanism 40 is provided for furnishing the necessary helical rotation of the tube 36. The drive mechanism includes means for gripping the tube 36 and for rotating the tube 36 about the axis thereof at a certain number of revolutions per minute, while advancing the tube 36 in a helical path along the longitudinal axis of the tube 36. It should be understood that any type of conventional drive mechanism may be utilized for furnishing the necessary helical rotation.

A vibrator fixture 42 is provided with a pair of lugs 44 and 46. An angle bracket 48 has one flange 50 connected to the back side of the fixture 42 by bolts 52. The other flange 54 of the bracket 48 is connected to one side of the tube support 14 by a plurality of bolts 56.

The fixture 42 carries the vibrator 60. The vibrator 60 is operated pneumatically and is of the type manufactured and sold by the Bradford Company. The vibrator 60 has a connection 62 which connects the interior of the casing of the vibrator 60 with a source of pressurized air. The vibrator 60 usually includes a movable piston, not shown, which vibrates between stops provided in the casing thereof so as to impart periodic impacts to the casing of the vibrator 60. As a result thereof, the entire vibrator 60 is moved in its axial direction as indicated by arrow A in FIGURE 2. Vibrator 60 is rated at 14,000 vibrations or oscillations per minute.

The leading end of the vibrator 60 carries a removable carbide point or tool 64. The leading end of the tool 64 is located on one side of the tube 36 and is adapted to be moved by the vibrator 60 towards and away from the outer peripheral surface of the tube 36 so as to periodically engage said surface as the tube 36 is advanced in the helical path by the drive mechanism 40. As a result of the oscillations of the tool 64, the end configuration thereof is impressed on the outer surface of the tube 36 in a predetermined pattern. The tool 64 is oscillated according to the rating of the vibrator 60.

The tool 64 carried by the vibrator 60 extends through an opening provided in lug 44. The vibrator 60 includes a stem 66 connected to the end of the casing. The stem 66 extends through an opening provided in the lug 46. A spring 68 is interposed between the casing end 70 and the lug 46 around the stem 66 so as to cushion the vibrator 60 during the back stroke of the vibrator 60 and tool 64. It will be appreciated that the entire vibrator assembly is free to oscillate such that the vibrator 60 floats in the fixture 42.

It should be understood that various patterns may be placed on the tube 36 utilizing the apparatus 10. By changing the tube r.p.m., tube helix angle, tool vibrations per minute, or tool end configuration, a wide variety of surface patterns can be developed.

It should also be understood that any number of vibrator assemblies may be utilized to impart the surface pattern on the tube. As an example three vibrator controlled tools 64 may be spaced in equal increments along the length of the tube, each vibrator assembly fabricating one-third of the tube's length.

FIGURE 1 illustrates the tool 64 placing relatively small dimples in the wall of the tube 36.

FIGURE 3 illustrates the same apparatus 10 with the exception that tool 72 has been substituted for the single pointed tool 64. Tool 72 has a plurality of pointing elements thereon and will as a result thereof place a different pattern on the helically advancing tube than tool 64.

The tube 36 is generally of thin wall construction and made from copper. However, it should be understood that tubes of other material may be utilized with the apparatus 10.

The drawing and the foregoing specification constitute a description of the improved device to form indentations or dimples on tubing O.D. surface in such full, clear, concise, and exact terms as to enable any person skilled in the art to practice the invention, the scope of which is indicated by the appended claims.

What we claim as our invention is:

1. A tube indenting apparatus for placing a predetermined pattern on the outer periphery of an elongated tube as it is advanced axially comprising a stationary tube support through which the tube is helically advanced, means for helically advancing the tube through said support, a tool having an end opposite the outer periphery of the tube, and means for reciprocating said tool in a direction transverse to the axis of the tube, said reciprocating tool being effective to impart its end configuration to the helically advancing tube to form a pattern thereon.

2. A tube indenting apparatus for placing a predetermined pattern on the outer periphery of an elongated tube as it is advanced axially comprising a stationary tube support through which the tube is helically advanced, means for helically advancing the tube in a forward direction through said support, a tool located forwardly of said support and having an end opposite the outer periphery of the tube, and a vibrator connected to said tool for reciprocating said tool in a direction transverse to the axis of the tube, said reciprocating tool being effective to impart its end configuration to the helically advancing tube to form a pattern thereon.

3. A tube indenting apparatus for placing a predetermined pattern on the outer periphery of an elongated tube as it is advanced axially comprising a stationary tube support through which the tube is helically advanced, means for helically advancing the tube in a forward direction through said support, a tool having an end opposite the outer periphery of the forward portion of the tube advanced through said support, and a vibrator connected to said tool and operatively connected to said support for limited movement in a direction transverse to the axis of the tube, said vibrator reciprocating said tool to impart its end configuration to the helically advancing tube to form a pattern thereon, said tube support including means providing lateral support for the forward portion of the tube advanced through said support when subjected to the impact forces created by said reciprocating tool.

4. A tube indenting apparatus for placing a predetermined pattern on the outer periphery of an elongated tube as it is advanced axially comprising a stationary tube support for supporting the intermediate portion of the tube and through which the tube is helically advanced, means for helically advancing the tube in a forward direction through said support, a tool having an end opposite the outer periphery of the forward portion of the tube advanced through said support, and means for reciprocating said tool in a direction transverse to the axis of the tube, said reciprocating tool being effective to impart its end configuration to the helically advancing tube to form a pattern thereon, the forward portion of the tube being cantileverly supported by said tube support at the time of the impact by said tool.

5. A tube indenting apparatus for placing a predetermined pattern on the outer periphery of an elongated tube as it is helically advanced comprising a base, a stationary tube fixture carried by said base for supporting an intermediate portion of the tube, and through which the tube is helically advanced, power driven means on said base and axially spaced from said tube fixture on one side thereof for helically advancing the tube in a forward direction through said fixture, a bracket secured to said tube fixture and spaced above said base at the opposite side of said tube fixture, a vibrator carried by said bracket for limited lengthwise movement in a direction transverse to the axis of the tube, said vibrator having a tool on one end thereof in close proximity to the outer periphery of the forward portion of the tube advanced through said support, said vibrator when energized being effective to reciprocate said tool in a direction transverse to the axis of the tube to impart the end configuration of the tool to the outer periphery of the helically advancing tube to form a pattern thereon.

6. The apparatus defined in claim 5 wherein said tube fixture includes means providing lateral support for the forward portion of the tube when subjected to the impact forces created by said reciprocating tool.

7. A tube indenting apparatus for placing a predetermined pattern on the outer periphery of an elongated tube as it is helically advanced comprising a base, a tube fixture carried by said base for supporting an intermediate portion of the tube and through which the tube is helically advanced, a generally L-shape support having one leg vertical and the other leg horizontal, with the free end of said one leg secured to said base and said other leg extending across the top of said tube fixture, adjustable fastening means carried by said other leg and engageable with the top surface of said tube fixture for holding same in a stationary position on said base, power driven means on said base and axially spaced from said tube fixture on one side thereof for helically advancing the tube in a forward direction through said fixture, a bracket secured to said fixture and spaced above said base at the opposite side of said tube fixture, a vibrator carried by said bracket for limited movement in a direction transverse to the axis of the tube, said vibrator having a tool on one end thereof in close proximity to the outer periphery of the forward portion of the tube advanced through said tube fixture, said vibrator when energized being effective to reciprocate said tool in a direction transverse to the axis of the tube to impart the end configuration of the tool to the outer periphery of the helically advancing tube to form a pattern thereon.

8. The apparatus defined in claim 7 wherein said tube fixture includes means providing lateral support for the forward portion of the tube when subjected to the impact forces created by said reciprocating tool.

References Cited by the Examiner
UNITED STATES PATENTS

| | | | |
|---|---|---|---|
| 372,669 | 11/1887 | Gowen | 72—76 |
| 399,366 | 3/1889 | Whitehill | 72—76 |
| 864,370 | 8/1907 | Grill | 72—76 |

CHARLES W. LANHAM, *Primary Examiner.*

R. D. GREFE, *Assistant Examiner.*